United States Patent
Lee et al.

(10) Patent No.: US 10,482,845 B2
(45) Date of Patent: Nov. 19, 2019

(54) ELECTRONIC APPARATUS AND RECORDING MEDIUM

(71) Applicant: SAMSUNG ELECTRONICS CO., LTD., Suwon-si, Gyeonggi-do (KR)

(72) Inventors: Yong-woo Lee, Hwaseong-si (KR); Chang-heon Yoon, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 64 days.

(21) Appl. No.: 15/635,355

(22) Filed: Jun. 28, 2017

(65) Prior Publication Data

US 2018/0061369 A1    Mar. 1, 2018

(30) Foreign Application Priority Data

Aug. 23, 2016    (KR) .................. 10-2016-0106685

(51) Int. Cl.
| | |
|---|---|
| *G09G 5/12* | (2006.01) |
| *G06F 3/01* | (2006.01) |
| *H04W 4/02* | (2018.01) |
| *H04W 4/08* | (2009.01) |
| *H04W 4/029* | (2018.01) |
| *G06F 3/0482* | (2013.01) |

(52) U.S. Cl.
CPC .............. *G09G 5/12* (2013.01); *G06F 3/017* (2013.01); *H04W 4/023* (2013.01); *H04W 4/029* (2018.02); *H04W 4/08* (2013.01); *G06F 3/0482* (2013.01); *G09G 2354/00* (2013.01); *G09G 2370/025* (2013.01); *G09G 2370/04* (2013.01); *G09G 2370/16* (2013.01)

(58) Field of Classification Search
CPC ......... H04W 52/0245; H04W 52/0225; H04W 4/023; H04W 4/029; H04W 4/80; H04W 4/06; H04W 4/025; H04W 24/04; G09G 2370/16; G09G 2354/00; G09G 2370/04; G09G 5/12; G06F 3/017; G06F 3/0482
See application file for complete search history.

(56) References Cited

U.S. PATENT DOCUMENTS

| | | | |
|---|---|---|---|
| 5,588,117 | A | 12/1996 | Karp et al. |
| 7,228,336 | B2 | 6/2007 | Henry |
| 7,287,070 | B2 | 10/2007 | Shaheen et al. |
| 8,179,958 | B2 | 5/2012 | Komiya et al. |
| 9,055,467 | B2 | 6/2015 | Hernandez et al. |
| 9,280,893 | B2 | 3/2016 | Koch |
| 2002/0178247 | A1 | 11/2002 | Shaheen et al. |

(Continued)

FOREIGN PATENT DOCUMENTS

| | | |
|---|---|---|
| KR | 10-2015-0087821 | 7/2015 |
| KR | 10-2016-0027652 | 3/2016 |

*Primary Examiner* — Xuemei Zheng
(74) *Attorney, Agent, or Firm* — Nixon & Vanderhye P.C.

(57) ABSTRACT

An electronic apparatus of the present disclosure includes: a communicator comprising communication circuitry configured to wirelessly communicate with one or more external apparatuses; a signal processor configured to process data; and a controller configured to control an external apparatus to be designated as a transmitter for transmitting data and the electronic apparatus to be designated as a receiver for receiving the data from the transmitter if it is determined that the external apparatus is within a preset distance of the electronic apparatus and the external apparatus is moving.

15 Claims, 10 Drawing Sheets

(56) References Cited

U.S. PATENT DOCUMENTS

| | | |
|---|---|---|
| 2003/0172117 A1 | 9/2003 | Henry |
| 2008/0205507 A1 | 8/2008 | Komiya et al. |
| 2013/0244575 A1* | 9/2013 | Forutanpour ....... H04M 1/7253 |
| | | 455/41.1 |
| 2013/0337849 A1* | 12/2013 | Wan ...................... G01S 5/0072 |
| | | 455/456.6 |
| 2014/0198646 A1 | 7/2014 | Hernandez et al. |
| 2014/0211961 A1 | 7/2014 | Koch |
| 2016/0063559 A1* | 3/2016 | Hargrove ........... G06Q 30/0261 |
| | | 705/14.58 |
| 2018/0004372 A1* | 1/2018 | Zurek .................. G06F 3/0484 |

* cited by examiner

ELECTRONIC APPARATUS AND RECORDING MEDIUM

CROSS-REFERENCE TO RELATED APPLICATION

This application is based on and claims priority under 35 U.S.C. § 119 to Korean Patent Application No. 10-2016-0106685 filed on Aug. 23, 2016 in the Korean Intellectual Property Office, the disclosure of which is incorporated by reference herein in its entirety.

BACKGROUND

Field

The present disclosure relates generally to an electronic apparatus capable of wirelessly exchanging data with various kinds of external apparatus and a recording medium, and for example to an electronic apparatus, which can be easily set to be designated as a transmitter for transmitting data to an external apparatus or a receiver for receiving data from an external apparatus, and a recording medium.

Description of Related Art

To compute and process predetermined information in accordance with certain processes, an electronic apparatus basically includes a central processing unit (CPU), a chipset, a memory, and the like electronic components for computation. Such an electronic apparatus may be variously classified in accordance with what kind of information will be processed therein or how it will be used. For example, the electronic apparatus is classified into an information processing apparatus such as a personal computer, a server or the like for processing general information; an image processing apparatus for processing image information; an audio apparatus for processing audio information; a home appliance for accomplishing some household functions; etc.

Among them, the frequently used image processing apparatus receives a content signal including video data from the exterior and processes the video data extracted from the content signal in accordance with various image processing processes. The image processing apparatus may display an image based on the processed video data on its own display panel, or output the processed video data to another display apparatus provided with a display panel so that the corresponding display apparatus can display an image based on the processed image signal. As a representative of the image processing apparatus that has no display panel, there is a set-top box. The image processing apparatus that has a display panel is called a display apparatus, and may for example includes a TV, a monitor, a portable multimedia player (PMP), a tablet computer, a mobile phone, etc.

These electronic apparatuses may not only respectively perform desired functions independently of one another, but also a plurality of electronic apparatuses may interwork with one another for the purpose of function extension or convenience. To this end, the plurality of electronic apparatuses has to communicate with one another through at least one of communication standards, and has to be separated as a data transmitter and a data receiver. Conventionally, a user has had to use a user interface (UI) provided by an electronic apparatus in order to set the electronic apparatus as the transmitter or the receiver. However, it is inconvenient for a user to intervene in setting the electronic apparatuses.

In particular, the present local network system mostly employs wireless communication, and an electronic apparatus is also provided as a mobile apparatus as well as a stationary apparatus. Accordingly, to make the system more convenient for a user, these electronic apparatuses are set without the user's input so far as possible when the electronic apparatuses interwork with one another.

SUMMARY

In accordance with an example aspect of an example embodiment, an electronic apparatus is provided including: a communicator comprising communication circuitry configured to wirelessly communicate with one or more external apparatuses; a signal processor configured to process data; and a controller configured to control an external apparatus to be designated as a transmitter for transmitting data and the electronic apparatus to be designated as a receiver for receiving the data from the transmitter if it is determined that the external apparatus is within a preset distance of the electronic apparatus and the external apparatus is moving. Thus, the electronic apparatus and the external apparatus are automatically designated as the data transmitter and the data receiver without a user's manual input in terms of exchanging data between the electronic apparatus and the external apparatus, thereby improving a user's convenience.

The controller may determine that the external apparatus is within the preset distance if intensity of a wireless signal received from the external apparatus through the communicator is higher than a preset threshold. Thus, the electronic apparatus can readily determine the proximity of the external apparatus.

The electronic apparatus may further include a sensor configured to sense movement of the electronic apparatus, wherein the controller may determine which one of the electronic apparatus and the external apparatus is moving, based on at least one of sensing information from the sensor and information about movement of the external apparatus received through the communicator. Thus, the electronic apparatus can readily determine which one of the electronic apparatus and the external apparatus is moved.

The controller may determine which one of the electronic apparatus and the external apparatus makes a motion gesture, and may designate the transmitter and the receiver in accordance with determination results.

The electronic apparatus may further include a sensor configured to sense a motion gesture of the electronic apparatus, wherein the controller may determine which one of the electronic apparatus and the external apparatus makes a motion gesture, based on at least one of sensing information from the sensor and information about the motion gesture of the external apparatus received through the communicator.

The electronic apparatus may further include: a storage; and a display, wherein the controller may control the display to display a user interface (UI) for allowing a user to select whether to store data if the data is received from the external apparatus designated as the transmitter, and may control the storage to selectively store the received data in accordance with a user's input to the UI.

The controller may determine an application capable of opening data received from the external apparatus designated as the transmitter, and automatically open the received data with the determined application.

The controller may determine whether there is information of designating the electronic apparatus as the transmitter or the receiver, and may designate the electronic apparatus as the transmitter or the receiver based on the information regardless of movement of the electronic apparatus or the external apparatus if it is determined that there is the information.

In accordance with an example aspect of another example embodiment, an electronic apparatus is provided, including: a communicator comprising communication circuitry configured to wirelessly communicate with one or more external apparatuses; a signal processor configured to process data; and a controller configured to control the electronic apparatus to be designated as a transmitter for transmitting data and an external apparatus to be designated as a receiver for receiving the data from the transmitter if it is determined that the external apparatus is within a preset distance of the electronic apparatus and the electronic apparatus is moving.

The controller may control a display to display a user interface (UI) for allowing a user to select at least one of pieces of data to be acquirable by the electronic apparatus, and may control the communicator to send the external apparatus the data selected by a user's input to the UI.

The electronic apparatus may further include a storage, wherein the data to be acquirable by the electronic apparatus may include data stored in the storage, or data stored in another apparatus and receivable through the communicator.

The controller may call for a selection history of the previously stored pieces of data, and may control the communicator to send the external apparatus a piece of data corresponding to the called selection history among the previously stored pieces of data.

The electronic apparatus may further include: a sensor configured to sense a user's motion; a storage configured to store information in which a group of data is designated corresponding to a user's motion, wherein the controller may control the sensor to sense a motion of the user, and controls the communicator to transmit the group of data designated in the information to the external apparatus in accordance with the sensed motion of the user.

In accordance with an example aspect of another example embodiment, a recording medium in which a program code of a method executable by a processor of an electronic apparatus is provided, the method including: sensing an external apparatus that within a preset distance of the electronic apparatus; determining whether the external apparatus is moving; and designating the external apparatus as a transmitter for transmitting data and the electronic apparatus as a receiver for receiving the data from the transmitter.

The sensing may include determining that the external apparatus is within the preset distance if intensity of a wireless signal received from the external apparatus through the communicator is higher than a preset threshold.

The determining may include determining which one of the electronic apparatus and the external apparatus is moving, based on at least one of sensing information from a sensor of the electronic apparatus for sensing movement of the electronic apparatus and information about movement of the external apparatus received from the external apparatus.

The recording medium may further include program code for determining which one of the electronic apparatus and the external apparatus makes a motion gesture, and designating the transmitter and the receiver in accordance with determination results.

The recording medium may further include program code for determining which one of the electronic apparatus and the external apparatus makes a motion gesture, based on at least one of sensing information from a sensor of the electronic apparatus for sensing the motion gesture of the electronic apparatus and information about the motion gesture of the external apparatus received from the external apparatus.

The recording medium may further include program code for: displaying a user interface (UI) for allowing a user to select whether to store data if the data is received from the external apparatus designated as the transmitter; and selectively storing the received data in accordance with a user's input to the UI.

The recording medium may further include program code for: determining an application capable of opening data received from the external apparatus designated as the transmitter; and automatically opening the received data with the determined application.

BRIEF DESCRIPTION OF THE DRAWINGS

The above and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Below, various example embodiments will be described in greater detail with reference to accompanying drawings. The following descriptions of the example embodiments are made by referring to elements shown in the accompanying drawings, in which like numerals refer to like elements having substantively the same functions.

In the description of the example embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the disclosure.

Figure 1:
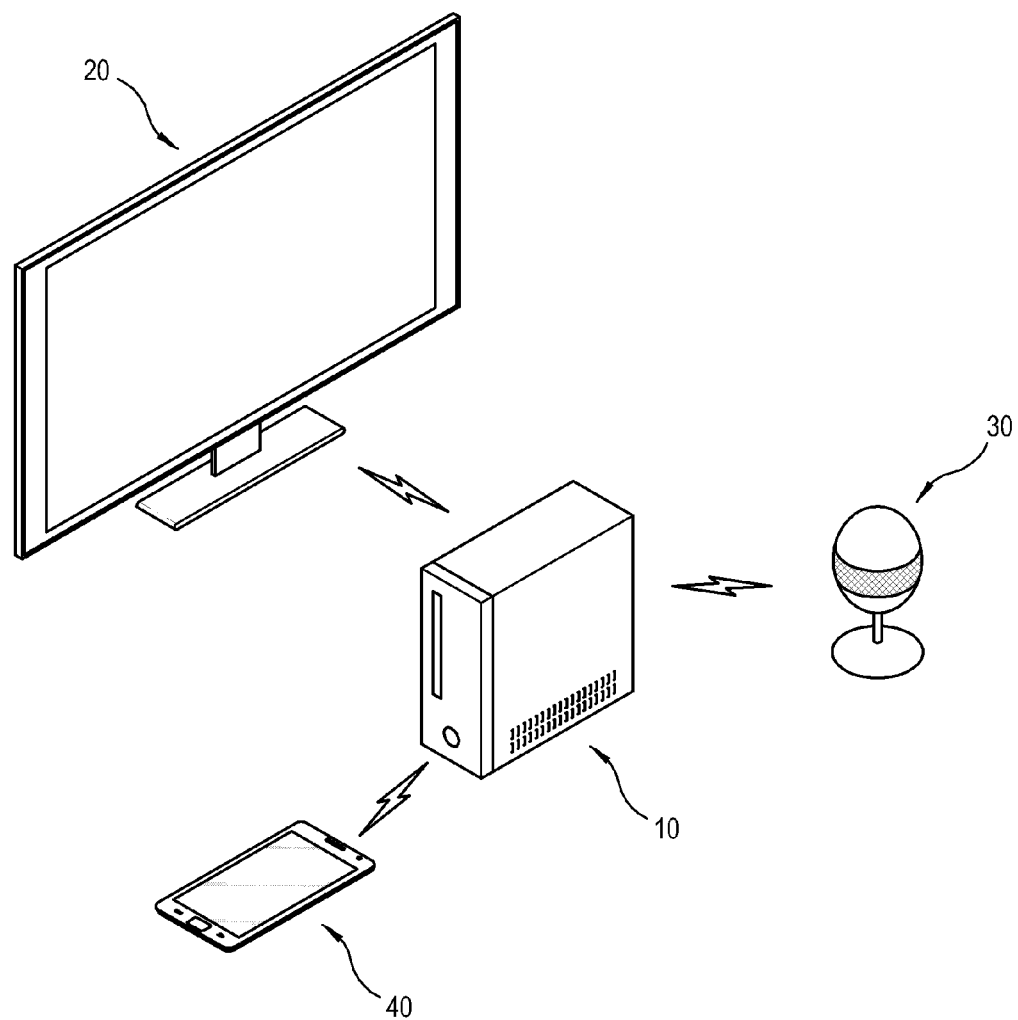
FIG. 1 is a diagram illustrating an example of a system according to an example embodiment.

FIG. 1 is a diagram illustrating an example of a system according to an example embodiment.

As illustrated in FIG. 1, a system according to an example embodiment includes a plurality of electronic apparatuses. In the system, there are no limits to the number and kind of electronic apparatus, and there are no limits to the plurality of electronic apparatuses grouped to interwork according to required functions. Further, each electronic apparatus of the system may be installed in a stationary manner or movably provided to be carried by a user. According to an example embodiment, at least one of the electronic apparatuses is a mobile apparatus in the system.

For example, the system according to an example embodiment includes a repeater 10 for relaying wireless communication between the electronic apparatuses to establish a wireless communication network, a TV 20 for processing a broadcast signal to display a broadcast image, and a loudspeaker 30 for outputting various sounds. The loudspeaker 30 is provided to support wireless communication so as to receive broadcast audio data from the TV 20 and output a sound based on the audio data. The TV 20 separates the broadcast signal received from the outside into video data and audio data, and displays the video data on its own display and transmits the audio data to the loudspeaker 30 via the repeater 10 in accordance with preset communication standards.

The repeater 10 may for example be achieved by an access point (AP), and relay wireless communication between the TV 20 and the loudspeaker 30. A hot spot refers to a communicable region centering on the repeater 10, so that the electronic apparatus which is placed within the hot spot can wirelessly connect with the repeater 10. In this example embodiment, the apparatuses 20, 30 and 40 communicate with one another via the repeater 10, but not limited thereto. Alternatively, the apparatuses 20, 30 and 40 may directly communicate with one another without the repeater 10.

The loudspeaker 30 not only outputs a sound based on the audio data provided by the TV 20, but also outputs a sound based on audio data of a content image being reproduced in the mobile apparatus 40 as desired by a user instead of the audio data from the TV 20.

In the system according to an example embodiment, the loudspeaker 30 outputs a sound based on audio data from the mobile apparatus 40 by performing the following operations.

The mobile apparatus 40 selects communication standards supported by the system in response to a user's input. For example, such communication standards include wireless fidelity (Wi-Fi), Bluetooth, Wi-Fi Direct, Zigbee, etc. In response to a user's input through a UI or the like, the mobile apparatus 40 selects the loudspeaker 30 as a receiver for receiving the audio data. By this selection, approval to a request for data transmission and communication connection are performed between the mobile apparatus 40 and the loudspeaker 30. In response to a user's input, the mobile apparatus 40 selects content to be transmitted and transmits the selected content to the loudspeaker 30.

In the system according to an example embodiment, two electronic apparatuses, between which data exchange is required, among the mobile apparatus 40, the loudspeaker 30 and the repeater 10 are automatically designated as a transmitter for data and a receiver for data, so that data or content can be more intuitionally and easily transmitted without a user's typical input through the UI of the transmitter. Specifically, one of the electronic apparatuses in the system according to an example embodiment, for example, the loudspeaker 30 senses the eternal apparatus, e.g. the mobile apparatus 40, which comes close thereto within a preset distance. If it is determined that the mobile apparatus 40 moves, the mobile apparatus 40 is designated as the transmitter for transmitting content, and the loudspeaker 30 is designated as the receiver for receiving the content. However, the designation of the transmitter and receiver may be varied depending on previously setting states. Alternatively, the mobile apparatus 40 may be designated as the receiver, and the loudspeaker 30 may be designated as the transmitter.

According to an example embodiment, there is no inconvenience since a user does not have to first designate the mobile apparatus 40 as the transmitter for transmitting content and then designate the loudspeaker 30 as the receiver for receiving the content. If the loudspeaker is connected to the repeater, the transmitter and the receiver may be designated in between the repeater and the mobile apparatus instead of the loudspeaker.

Below, a method of controlling the mobile apparatus 40 and the loudspeaker 30 will be described according to an example embodiment.

Figure 2:
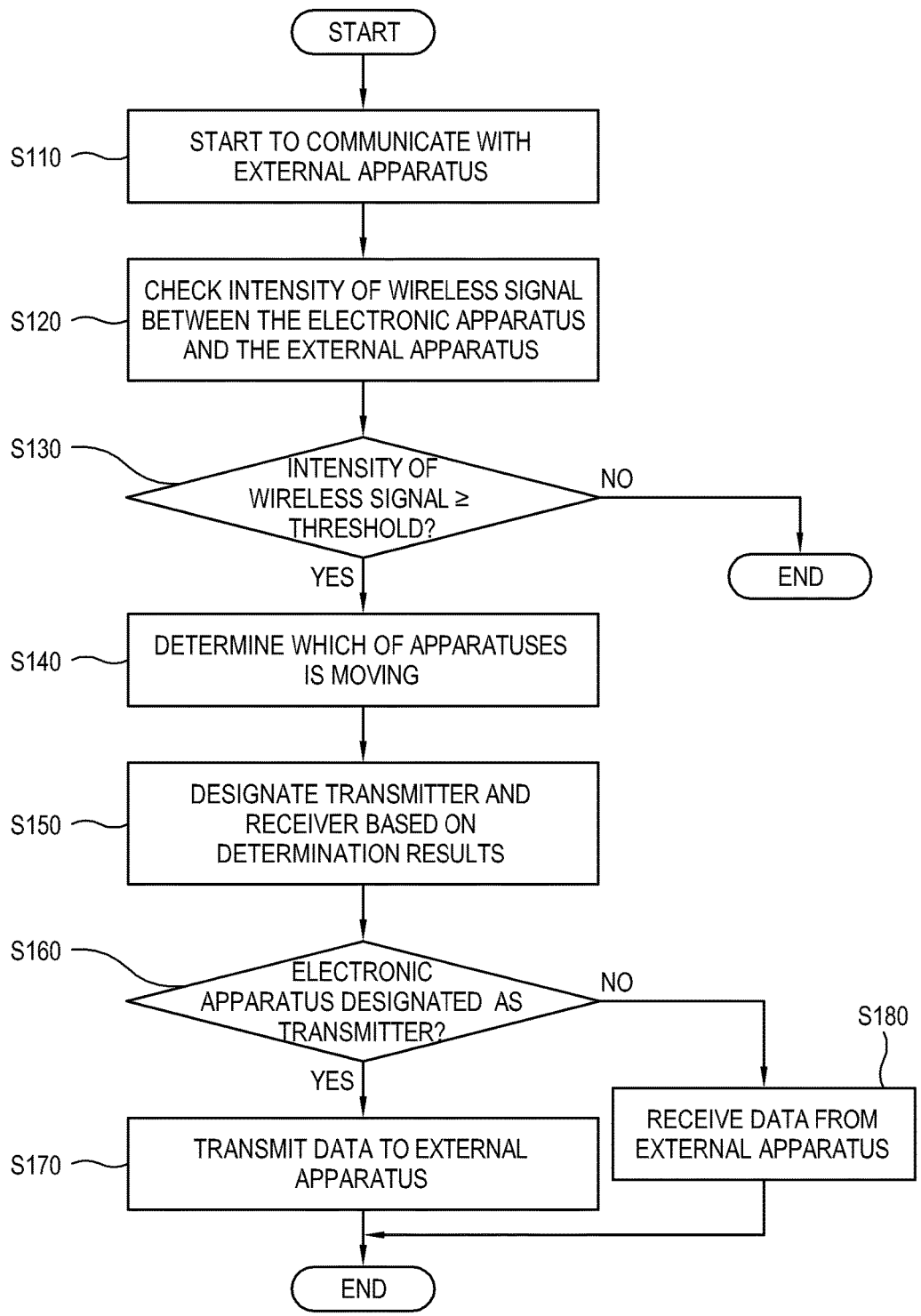
FIG. 2 is a flowchart illustrating an example of controlling an electronic apparatus according to an example embodiment.

FIG. 2 is a flowchart illustrating an example of controlling an electronic apparatus according to an example embodiment.

As illustrated in FIG. 2, at operation S110 the electronic apparatus connects and communicates with the external apparatus.

At operation S120 the electronic apparatus checks intensity of a wireless signal between the electronic apparatus and the external apparatus.

At operation S130 the electronic apparatus monitors whether the intensity of the wireless signal is higher than or equal to a threshold.

If the intensity of the wireless signal is higher than the threshold, at operation S140 the electronic apparatus checks one of the electronic apparatus and the external apparatus which move close to each other. That is, the electronic apparatus determines whether the state where the electronic apparatus and the external apparatus come close to each other is caused by movement of the electronic apparatus or movement of the external apparatus. On the other hand, if the intensity of the wireless signal is not higher than the threshold, the electronic apparatus performs another separately prepared process without performing a process related to this example embodiment.

For example, if the intensity of the wireless signal gradually increases and becomes higher than the threshold, it is determined that at least one of the electronic apparatus and the external apparatus moves close to the other one. In this condition, if it is sensed that the electronic apparatus moves, it is determined that the electronic apparatus moves. On the other hand, if it is sensed that the electronic apparatus does not move, it is determined that the external apparatus moves.

At operation S150 the electronic apparatus designates the electronic apparatus as the transmitter or the receiver based on the determination results. Based on the designation of the electronic apparatus, the external apparatus is designated as the receiver or the transmitter. Whether to designate the moving apparatus as the transmitter or the receiver may be varied depending on previous settings stored in each of the electronic apparatus and the external apparatus. Since the electronic apparatus and the external apparatus are provided to communicate with each other, information about which one of the electronic apparatus and the external apparatus moves may be shared between them.

At operation S160 the electronic apparatus determines whether the electronic apparatus is designated as the transmitter.

If the electronic apparatus is designated as the transmitter, at operation S170 the electronic apparatus transmits previously stored data to the external apparatus so that the external apparatus can process and output the data. On the other hand, if the electronic apparatus is not designated as the transmitter, but instead as the receiver, at operation S180 the electronic apparatus processes and outputs data received from the external apparatus.

Further, an operation of selecting data in the transmitter may be added in between the operation S160 and the operation S170. The transmitter may have various criteria for selecting data to be transmitted to the receiver among many pieces of previously stored data, and this will be described later.

Thus, the system including the electronic apparatus and the external apparatus according to an example embodiment is convenient for a user in data interworking between the electronic apparatus and the external apparatus with the user's minimum and/or reduced control.

In this example embodiment, the electronic apparatus determines whether the intensity of the wireless signal is higher than the threshold, thereby determining whether the electronic apparatus and the external apparatus are close to each other. Besides the intensity of the wireless signal, various methods and structures may be used to determine whether the electronic apparatus and the external apparatus are close to each other. For example, the electronic apparatus may include a photo-sensor, an ultrasonic sensor or the like sensor for sensing the proximity of the external apparatus in order to determine whether the external apparatus comes close thereto based on sensing results of such a sensor. Further, such a sensor may be not only provided as a built-in device in the electronic apparatus but also provided as an independent device separately from the electronic apparatus. In case where the sensor is provided as the independent device, the sensing results may be transmitted from the sensor to the electronic apparatus by a wire or wirelessly.

Below, the operation of checking the intensity of the wireless signal between the electronic apparatus and the external apparatus will be described.

Figure 3:
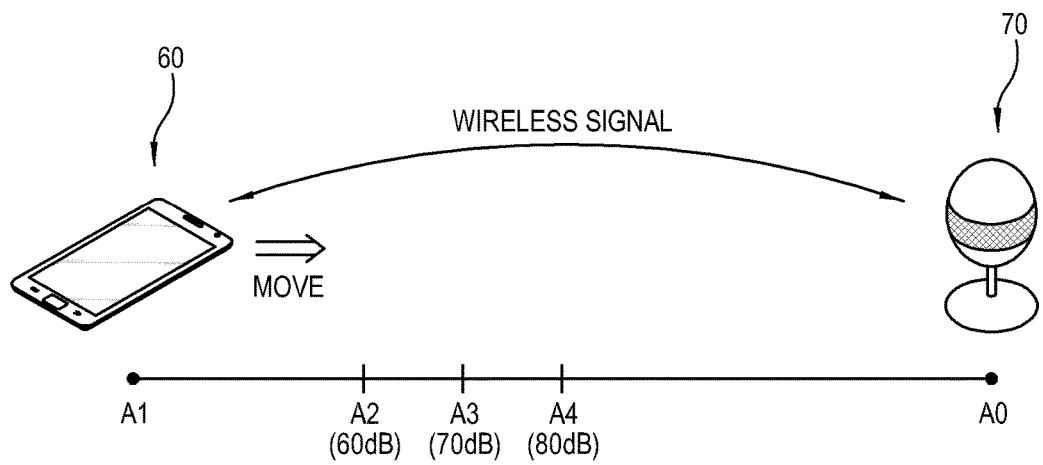
FIG. 3 is a diagram illustrating example intensity of a wireless signal according to distances between the electronic apparatus according to an example embodiment and an external apparatus.

FIG. 3 is a diagram illustrating example intensity of a wireless signal according to distances between the electronic apparatus according to an example embodiment and an external apparatus;

As illustrated in FIG. 3, suppose that an external apparatus 70 is installed to be stationary and an electronic apparatus 60 moves close to the external apparatus 70.

For communication between the electronic apparatus 60 and the external apparatus 70, the electronic apparatus 60 has to be located within a hot spot of the external apparatus 70. Let the external apparatus 70 be installed at a position A0 and the hot spot have an outermost boundary of A1. As the electronic apparatus 60 moves from A1 toward the external apparatus 70, communication between the electronic apparatus 60 and the external apparatus 70 is enabled. For example, the electronic apparatus 60 senses a wireless signal from the external apparatus 70 within the hot spot and accesses the external apparatus 70 based on information about the sensed wireless signal. Alternatively, the external apparatus 70 may sense the wireless signal from the electronic apparatus 60 and access the electronic apparatus 60.

To check whether normal communication is possible between the electronic apparatus 60 and the external apparatus 70, a wireless signal is periodically transmitted and received between the electronic apparatus 60 and the external apparatus 70. Such a wireless signal is just to determine communication conditions, and therefore there are no specific information. The communication conditions between the electronic apparatus 60 and the external apparatus 70 may be represented by the intensity of the wireless signal between them, and the intensity of the wireless signal is in inverse proportion of a distance between them. That is, if the electronic apparatus 60 is located at a certain position where the intensity of the wireless signal is higher than a preset threshold, the communication conditions of this position are good. On the other hand, if the electronic apparatus 60 is located at a certain position where the intensity of the wireless signal is not higher than the threshold, the communication conditions of this position are bad.

For example, if the intensity of the wireless signal is equal to a threshold of 70 dB when the electronic apparatus 60 is located at a position A3, the communication conditions are good when the electronic apparatus 60 is located at a position A4 closer to the external apparatus than the position A3, but band when the electronic apparatus 60 is located at a position A2 more distant from the external apparatus 70 than the position A3.

That is, the intensity of the wireless signal gradually increases as the electronic apparatus 60 moves from the position A1 to the position A0, and goes beyond the threshold 70 dB if the electronic apparatus 60 passes by the position A3. On the other hand, the intensity of the wireless signal gradually decreases if the electronic apparatus 60 moves away from the position A0.

Like this, the electronic apparatus 60 or the external apparatus 70 checks whether the intensity of the wireless signal goes beyond the threshold, and thus determines whether the electronic apparatus 60 and the external apparatus 70 move close to each other.

Although the increase in the intensity of the wireless signal to become higher than the threshold between the electronic apparatus 60 and the external apparatus 70 indicates that the electronic apparatus 60 and the external apparatus 70 move close to each other, it is difficult to show which one of the electronic apparatus 60 and the external apparatus 70 moves.

Therefore, the electronic apparatus 60 includes a sensor for sensing whether the electronic apparatus 60 moves or not. With this sensor, it is possible to sense the electronic apparatus 60 moves or not. The sensing results of the sensor are transmitted from the electronic apparatus 60 to the external apparatus 70 and thus shared with the external apparatus 70.

Below, the structure of the electronic apparatus 60 will be described.

Figure 4:
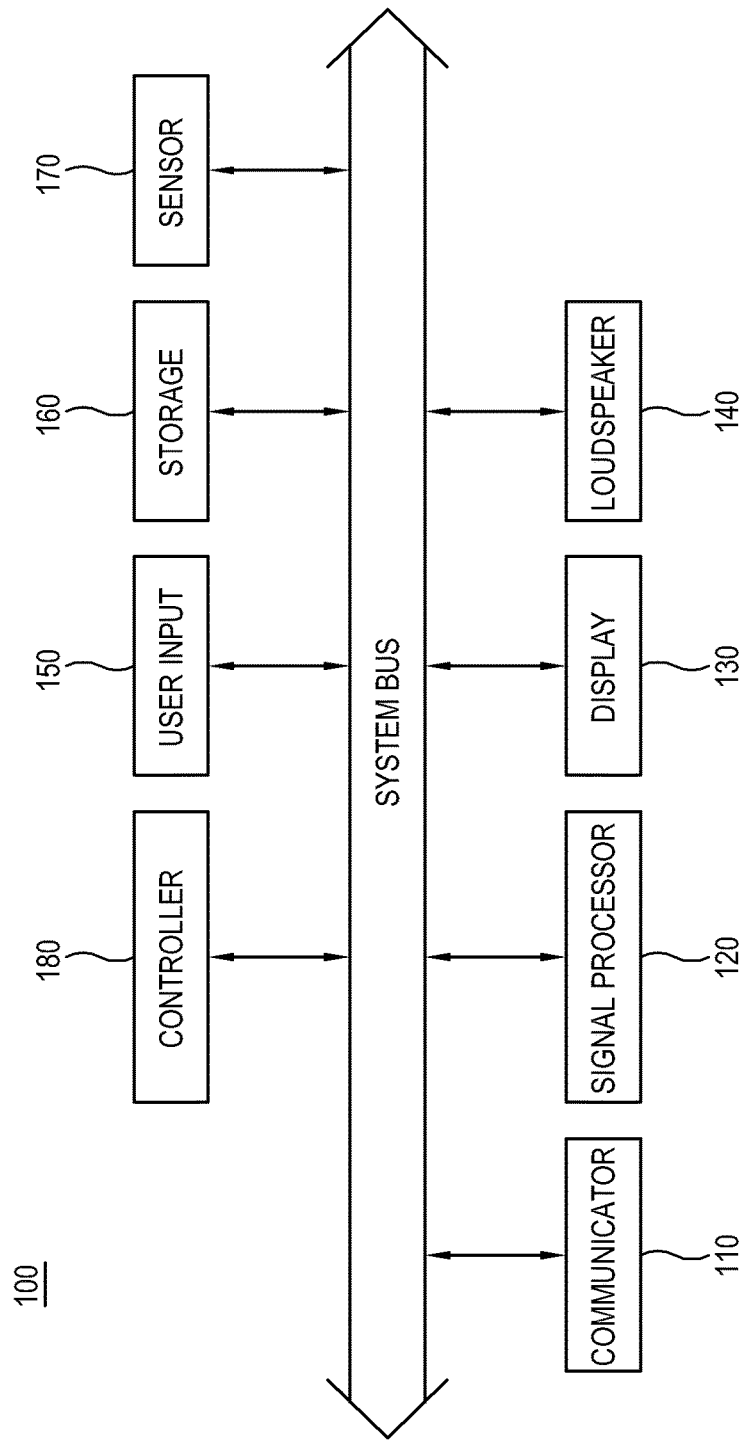
FIG. 4 is a block diagram illustrating an example electronic apparatus according to an example embodiment.

FIG. 4 is a block diagram illustrating an example electronic apparatus according to an example embodiment.

As illustrated in FIG. 4, an electronic apparatus 100 may include a display apparatus as a mobile apparatus such as a tablet computer, a mobile phone, a wearable device, or the like, but not limited thereto. Besides, the electronic apparatus 100 may be achieved by various types or kinds of apparatuses such as the loudspeaker. Below, the display apparatus will be described as an example of the electronic apparatus 100 in this example embodiment. However, the structure of the electronic apparatus 100 may be achieved variously in accordance with its types or kinds.

The electronic apparatus 100 includes a communicator (e.g., including communication circuitry) 110 for communicating with an external apparatus, a signal processor (e.g., including processing circuitry) 120 for processing data transmitted and received through the communicator 110 in accordance with various processes, a display 130 for displaying an image based on video data processed by the signal processor 120, a loudspeaker 140 for outputting a sound based on audio data processed by the signal processor 120, a user input (e.g., including input circuitry) 150 for receiving a user's input, a storage 160 for storing data, a sensor 170 for sensing movement of the electronic apparatus 100, and a controller (e.g., including processing circuitry) 180 for performing calculation and control with regard to operations of the electronic apparatus 100. These elements are connected to one another through a system bus.

The communicator 110 may include various communication circuitry, such as, for example, and without limitation, a hardware communication module or communication circuit for receiving data from the external apparatus and transmitting the data to the external apparatus. The communicator 110 may also include additional communication circuitry, such as, for example, and without limitation, a wireless communication module for wirelessly receiving packet data, a tuning chip to be tuned to a frequency designated for a radio frequency (RF) signal, a connection port to which an external memory such as a universal serial bus (USB) memory is connected, etc.

The signal processor 120 may include various processing circuitry to processes content data received in the communicator 110 so that content can be reproduced. The content includes video and audio and the like multimedia content, and various kinds of pieces of information such as a text, an application, etc. The signal processor 120 may include various processing circuitry, such as, for example, and without limitation, a hardware processor realized by a chipset, a digital signal processor (DSP), a buffer, a circuit and the like mounted to a printed circuit board, and may be designed as a system on chip (SoC) as necessary. The signal processor 120 performs a process specialized in accordance with the kinds of content to be reproduced. For example, the signal processor 120 may perform video processing processes such as decoding, detail enhancement, scaling, etc. with regard to data of video content, and audio processing processes such as channel division, amplification, volume control, etc. with regard to data of audio content.

The display 130 displays an image based on video data processed by the signal processor 120. There are no limits to the type of the display 130, and the display 130 may have a light receiving structure such as a liquid crystal display (LCD) panel, or a self-emissive structure such as an organic light emitting diode (OLED), or the like, but is not limited thereto. Further, the display 130 may include a display panel and additionally include an additional structure according to types of the display panel. For example, if the display 130 includes an LCD panel, the display 130 includes a backlight unit for emitting light to the LCD panel, a panel driving substrate for driving the LCD panel 130, etc.

The loudspeaker 140 outputs a sound based on audio data processed by the signal processor 120. The loudspeaker 140 includes a unit loudspeaker corresponding to audio data of one audio channel. For example, if audio data is of a plurality of audio channels, the loudspeaker 140 includes a plurality of unit loudspeakers respectively corresponding to the plurality of audio channels of the audio data.

The user input 150 may include various input circuitry that transmits various preset control command or information to the signal processor 120 in response to a user's control or input. That is, the user input 150 sends the signal processor 120 various events caused by a user's control corresponding to a user's intention, so that the signal processor 120 can operate corresponding to the event. The user input 150 may be variously achieved in accordance with information input methods. For example, the user input 150 may include various input circuitry installed in the electronic apparatus 100, such as, for example, and without limitation, a key provided in an outer side of the electronic apparatus 100, a touch screen provided in the display 130, etc.

The storage 160 stores various pieces of data under the calculation and control of the controller 180. The storage 160 is accessed by the controller 180 so that the data can be read, written, modified, deleted, updated and so on. The storage 160 includes a nonvolatile memory such as a flash memory, a hard disc drive (HDD), a solid state drive (SSD) and the like to retain data regardless of whether the electronic apparatus 100 is powered on or off; and a volatile memory such as a buffer, a random access memory (RAM) and the like to which data to be processed by the controller 180 is temporarily loaded.

The sensor 170 senses whether the electronic apparatus 100 moves or not when a user carries the electronic apparatus 100, or senses the orientation or the like of the electronic apparatus 100 when a user makes a gesture with the electronic apparatus 100. To this end, the sensor 170 may include, for example, and without limitation, a magnetic sensor, a geomagnetic sensor, an acceleration sensor, a gyro sensor, a frequency sensor, etc. For example, if a user moves in a certain direction with the electronic apparatus 100, the sensor 170 generates a sensing signal corresponding to the movement of the electronic apparatus 100 and transmits the sensing signal to the controller 180.

The controller 180 may include various processing circuitry, such as, for example, and without limitation, a dedicated processor, a central processing unit (CPU) or a microprocessor, and performs calculation for processes of the signal processor 120 and control for operations of the electronic apparatus 100. In this example embodiment, the controller 180 controls the communicator 110 to communicate with the external apparatus, and determines whether the electronic apparatus 100 moves or not based on the sensing signal of the sensor 170.

The controller 180 determines that the electronic apparatus 100 is currently moving if receiving a sensing signal showing the movement of the electronic apparatus 100 from the sensor 170 in the state that the intensity of the wireless signal is higher than the threshold, and then designates the electronic apparatus 100 as the transmitter in accordance with the determination results. Further, the controller 180 determines that not the electronic apparatus 100 but the external apparatus is currently moving if receiving not a sensing signal showing the movement of the electronic apparatus 100 from the sensor 170 but information showing the movement of the external apparatus from the external apparatus through the communicator 110 in the state that the intensity of the wireless signal is higher than the threshold, and then designates the electronic apparatus 100 as the receiver in accordance with the determination results. Of course, the designation of the transmitter or receiver based on the determination results may be varied depending on previous setting states.

Like this, the electronic apparatus 100 includes the sensor 170 and thus senses whether the electronic apparatus 100 is currently moving or not.

After the electronic apparatus 100 is designated as the transmitter, the electronic apparatus 100 has to select data to be transmitted to the receiver, e.g., the external apparatus. The transmitter may have many methods or criteria for selecting data to be transmitted to the receiver among pieces of previously stored data, which will be described later.

Figure 5:
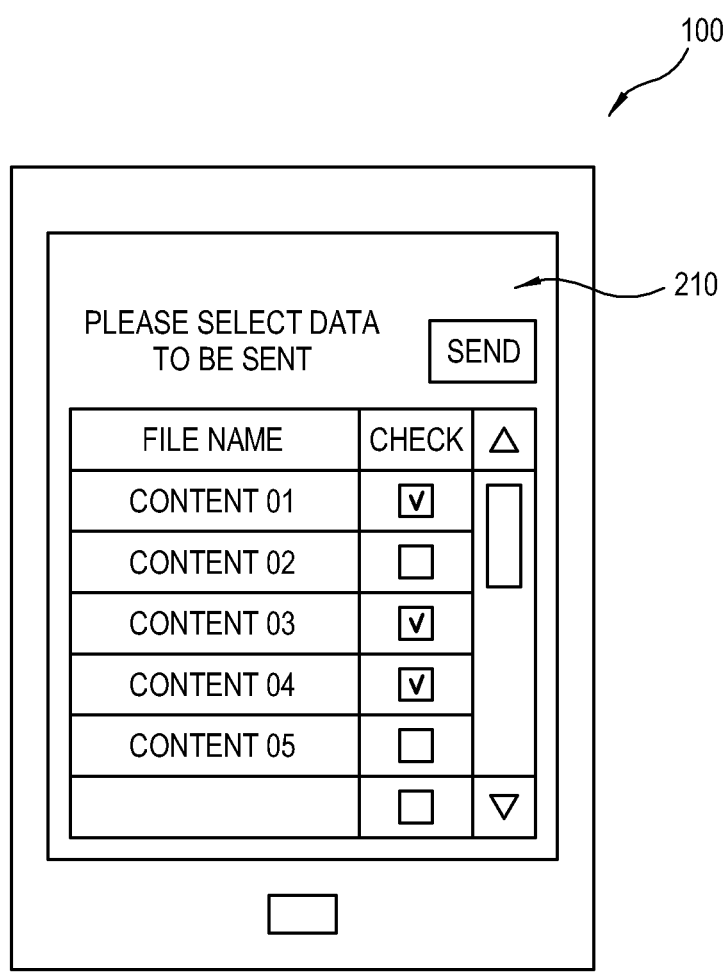
FIG. 5 is a diagram illustrating an example of a user interface (UI) displayed on the electronic apparatus according to an example embodiment.

FIG. 5 is a diagram illustrating an example of a user interface (UI) displayed on the electronic apparatus according to an example embodiment.

As illustrated in FIG. 5, the electronic apparatus 100 is designated as the transmitter based on a result of sensing whether the electronic apparatus 100 is moving or not in the state that the intensity of the wireless signal between the electronic apparatus 100 and the external apparatus is higher than the threshold. If the electronic apparatus 100 is designated as the transmitter, the electronic apparatus 100 selects data to be transmitted to the receiver, e.g., the external apparatus in accordance with a preset criterion.

As an example, the electronic apparatus 100 determines whether there is content data being currently reproduced. For example, the electronic apparatus 100 may reproduce multimedia video and audio content through a multimedia reproducing application. Like this, if content data is being currently reproduced, the electronic apparatus 100 automatically transmits this content data to the external apparatus.

Alternatively, the data to be transmitted to the external apparatus may be previously selected in the electronic apparatus 100. The electronic apparatus 100 selects data, to which a transmission flag is given, in indexes of the data. Such a transmission flag may be previously selected by a user and then stored in the electronic apparatus 100.

Alternatively, previously stored selection history information may be called by the electronic apparatus 100, and data designated by the selection history information may be selected.

Alternatively, the electronic apparatus 100 may display a user interface (UI) 210. The UI 210 shows a list of files of content data stored in the electronic apparatus 100, in which the files are individually selectable. If a user selects the files through the UI 210, the electronic apparatus 100 transmits the selected files to the external apparatus.

However, the content data shown through the UI 210 is not limited to only the content data stored in the electronic apparatus 100. For example, if the electronic apparatus 100 can access a server through the Internet, the UI 210 may show the content data stored in the server so that this content data can be selectable. If the content data from the server is selected through the UI 210, the electronic apparatus 100 downloads the selected content data from the server and transmits the downloaded content data to the external apparatus.

Alternatively, if the electronic apparatus 100 moves close to the external apparatus in the state that predetermined files are selected by calling the UI 210 previously shown to a user, the electronic apparatus 100 may transmit the selected files to the external apparatus after the electronic apparatus 100 is designated as the transmitter.

Alternatively, the electronic apparatus 100 may sense a user's gesture through the sensor, and select the content data in accordance with the gesture.

Figure 6:
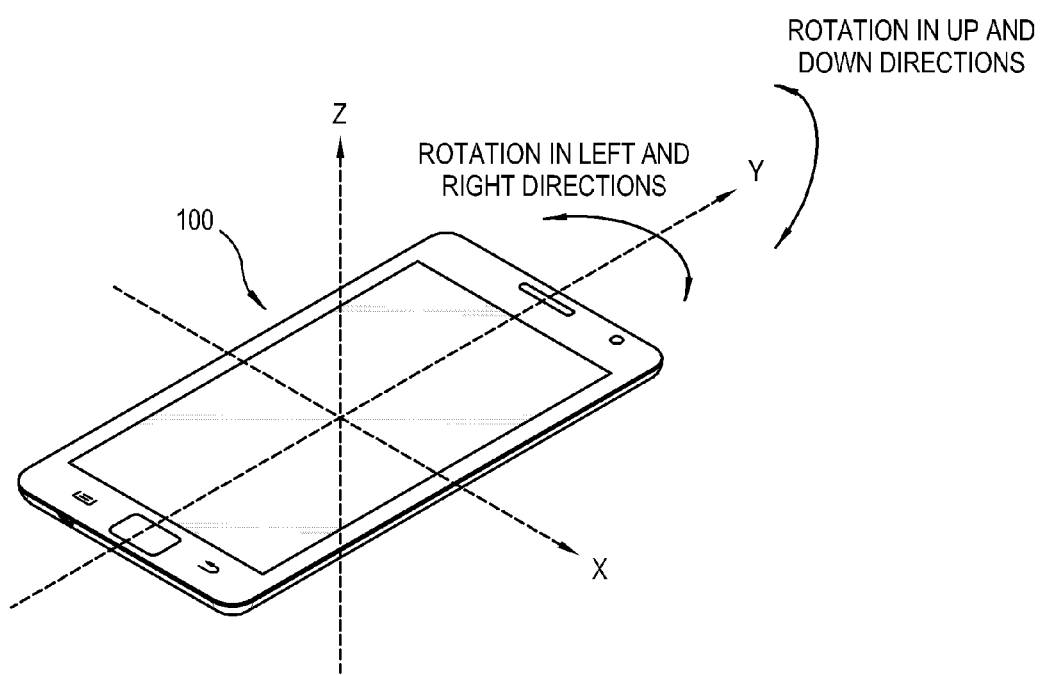
FIG. 6 is a diagram illustrating an example in which a user makes a certain gesture with the electronic apparatus according to an example embodiment to have a specific gesture.

FIG. 6 is a diagram illustrating an example in which a user makes a certain gesture with the electronic apparatus according to an example embodiment to have a specific gesture.

As illustrated in FIG. 6, if the electronic apparatus 100 is a mobile apparatus, a user can make various gestures with the electronic apparatus 100. Typically, a user may make shake an upper portion of the electronic apparatus 100 up and down or left and right while holding a lower portion of the electronic apparatus 100 with one hand.

A user may categorize the content data of the electronic apparatus 100 in accordance with various conditions. For example, the content data is categorized according to the kinds, genres or the like conditions of content, and a gesture is set corresponding to each category. For instance, let an axial line of X be in left and right directions, an axial line of y be in forward and backward directions, and an axial line of z be in up and down directions or a vertical direction. If the electronic apparatus 100 is rotated from a default state in a rightward direction, data may be selected from a video category. If the electronic apparatus 100 is rotated from the default state in a leftward direction, data may be selected from an audio category.

If the electronic apparatus 100 is designated as the transmitter like that of the foregoing example embodiment, the electronic apparatus 100 senses a gesture, selects content data corresponding to the sensed gesture, and transmits the selected content data to the receiver. Here, the gesture may be sensed at many points of time. For example, the electronic apparatus 100 may sense a gesture made after the point of time when the electronic apparatus 100 connects and communicates with the external apparatus, or sense after the point of time when the intensity of the wireless signal is higher than the threshold.

Alternatively, as one of the methods of automatically selecting the content data without a user's input, the electronic apparatus 100 calls the content selection history in the electronic apparatus 100, and selects the content that has a history of being selected within a preset time from the called content selection history. For example, the electronic apparatus 100 may select pieces of content, which have histories of being selected within one hour from the current time, among the previously stored pieces of content.

Suppose that a user downloads multimedia content by accessing an App Store of the Internet through the mobile apparatus while the user is out, and then reproduces the downloaded content through not the mobile apparatus but the TV after the user returns home. After the user returns home, if the user with the mobile apparatus moves close to the TV, the mobile apparatus is designated as the transmitter and the TV is designated as the receiver as described in the foregoing example embodiment. Then, the mobile apparatus selects the previously downloaded and stored content data based on the content selection history, and transmits the selected content data to the TV so that the TV can reproduce the content data.

Like this, the electronic apparatus 100 may use various methods to select data to be transmitted to the receiver.

Below, another example embodiment will be described.

Figure 7:
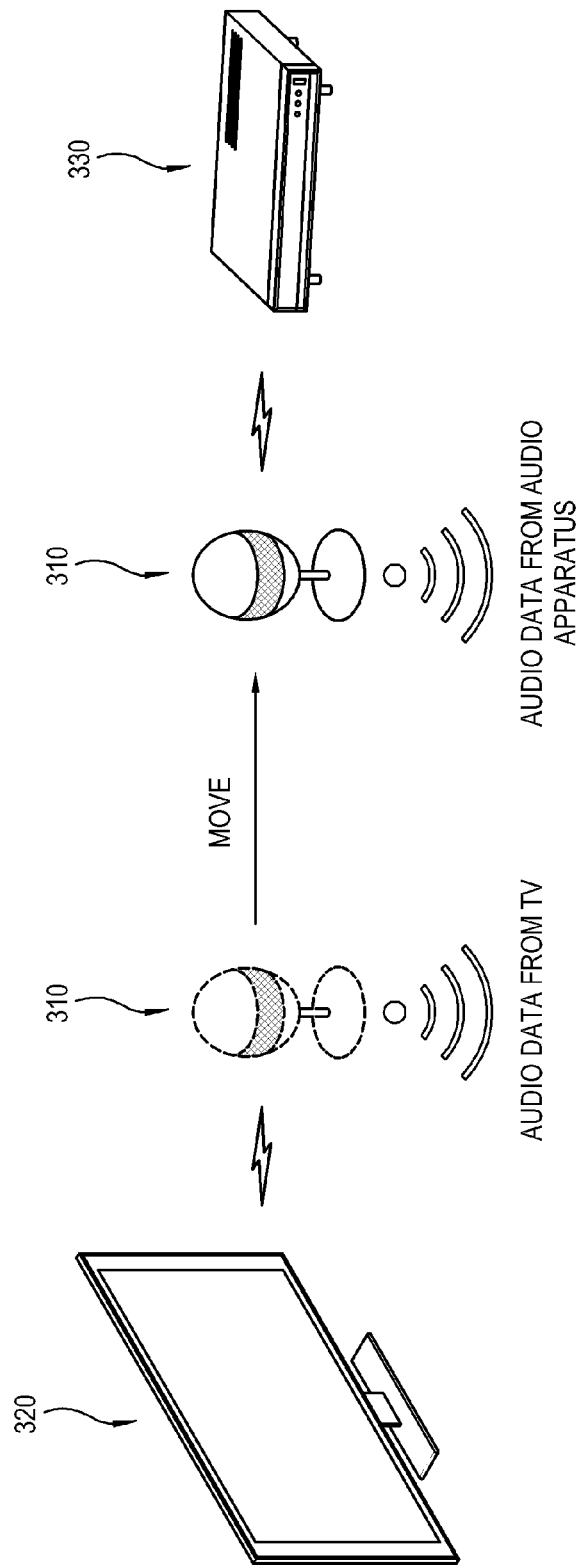
FIG. 7 is a diagram illustrating an example in which a loudspeaker according to an example embodiment moves from a TV toward an audio apparatus.

FIG. 7 is a diagram illustrating an example in which a loudspeaker according to an example embodiment moves from a TV toward an audio apparatus.

As illustrated in FIG. 7, a loudspeaker 310 in this embodiment is a mobile apparatus that can be carried by a user. In an initial state, the loudspeaker 310 outputs a sound based on audio data wirelessly received from the TV 320. If a user wants to listen to a sound based on not audio data from the TV 320 but audio data from the audio apparatus 330 through the loudspeaker 310, the user takes the loudspeaker 310 and moves close to the audio apparatus 330. Here, the foregoing present concept is also applied to the loudspeaker 310 and the audio apparatus 330.

As the loudspeaker 310 gets closer to the audio apparatus 330, the intensity of the wireless signal between the loudspeaker 310 and the audio apparatus 330 becomes higher than the threshold. The loudspeaker 310 includes a built-in sensor to sense its own movement. In accordance with sensing results, the loudspeaker 310 is designated as the receiver, and the audio apparatus 330 is designated as the transmitter.

In the initial state, the loudspeaker 310 used as the receiver receives audio data from the TV 320 used as the transmitter. On the other hand, if the audio apparatus 330 is designated as a new transmitter, the loudspeaker 310 receives audio data from the audio apparatus 330 instead of the TV 320.

If there are two apparatuses and it is sensed that one of the apparatuses is moving, it will be determined which one of the apparatuses will be designated as the transmitter or the receiver, based on previously set conditions or characteristics of the apparatus.

Figure 8:
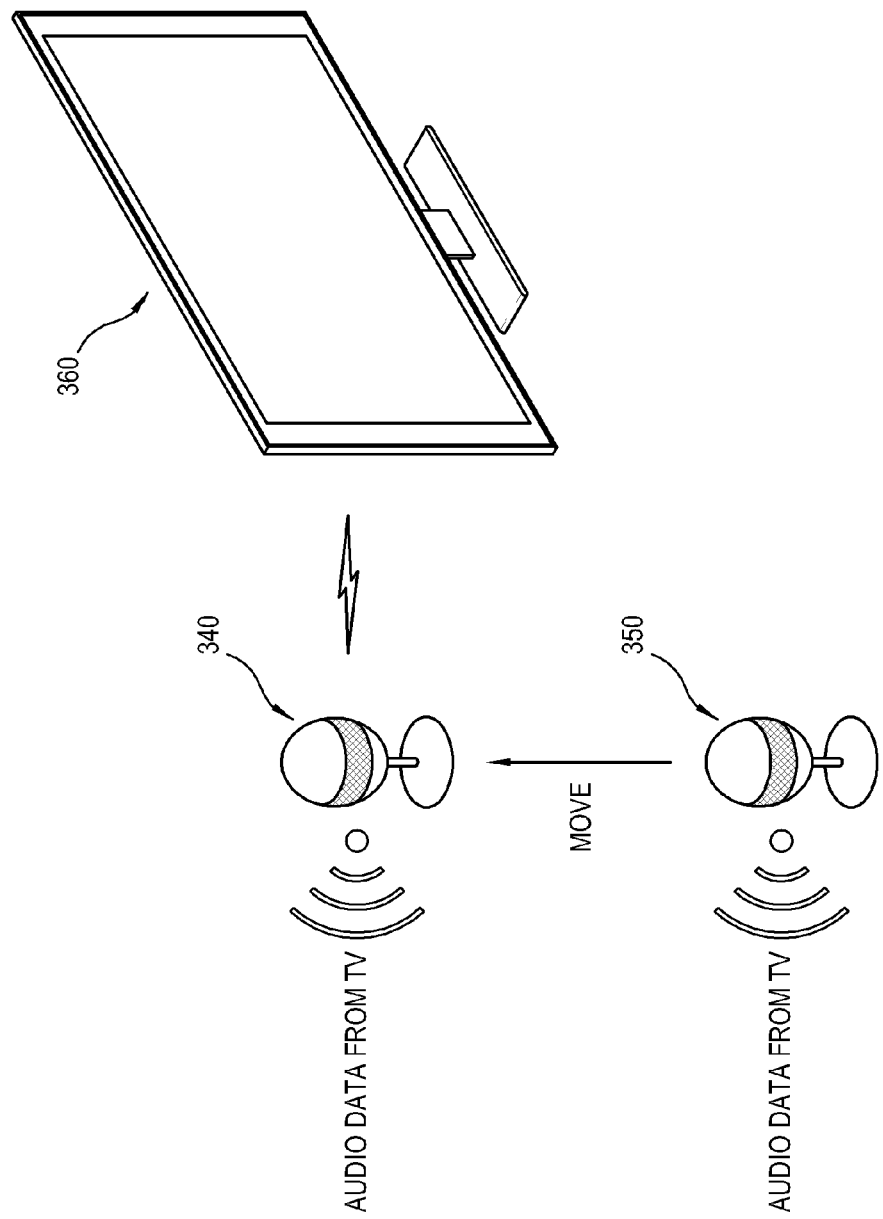
FIG. 8 is a diagram illustrating an example in which a second loudspeaker moves close to a first loudspeaker in a system according to an example embodiment including the first loudspeaker and the second loudspeaker.

FIG. 8 is a diagram illustrating an example in which a second loudspeaker moves close to a first loudspeaker in a system according to an example embodiment including the first loudspeaker and the second loudspeaker.

As illustrated in FIG. 8, in an initial state, a first loudspeaker 340 in this example embodiment outputs a sound based on audio data transmitted from a TV 360. In this state, a user may take a second loudspeaker 350 and moves close to the first loudspeaker 340.

If the intensity of the wireless signal between the first loudspeaker 340 and the second loudspeaker 350 becomes higher than the threshold and it is thus sensed that the second loudspeaker 350 is moving, the first loudspeaker 340 is designated as the transmitter and the second loudspeaker 350 is designated as the receiver in accordance with sensing results.

At this time, the first loudspeaker 340 not only outputs the sound based on the audio data received from the TV 360 but also transmits the audio data to the second loudspeaker 350. Thus, both the first loudspeaker 340 and the second loudspeaker 350 can output the sound based on the audio data from the TV 360.

Alternatively, the first loudspeaker 340 may not output the sound based on the audio data received from the TV 360 but transmit the audio data to the second loudspeaker 350. That is, the first loudspeaker 340 may just relay the audio data from the TV 360 to the second loudspeaker 350 without outputting the sound. In this case, the audio data from the TV 360 is output as the sound through only the second loudspeaker 350.

Like this, various methods are possible to transmit data between the apparatuses.

In the foregoing example embodiment, the data is transmitted within the system including the TV and the loudspeaker, but there are no limits to the present concept. A series of processes according to an example embodiment includes checking the intensity of the wireless signal between two apparatuses, e.g., between the electronic apparatus and the external apparatus, specifying the apparatus that is moving, designating the respective apparatuses as the transmitter and the receiver, and transmitting selected data from the transmitter to the receiver. Here, these processes may be achieved in various embodiments.

As one of the embodiments, suppose that a user moves a first mobile apparatus close to a second mobile apparatus under a system including the first mobile apparatus and the second mobile apparatus. If the first mobile apparatus is designated as the transmitter, the first mobile apparatus transmits previously stored multimedia data, address book information, phone number information, etc. to the second mobile apparatus.

As one of the embodiments, suppose that a user moves a mobile apparatus close to a TV under a system including the mobile apparatus and the TV. If the TV displaying a predetermined content image is designated as the transmitter, the mobile apparatus receives data corresponding to the content image from the TV and displays the content image. Thus, the mobile apparatus displays the same image as the content image displayed on the TV.

As one of the embodiments, suppose that a user moves a mobile apparatus close to a refrigerator under a system including the mobile apparatus and the refrigerator. If the mobile apparatus is designated as the transmitter and the refrigerator includes a display, the mobile apparatus transmits previously stored information about a schedule or a recipe to the refrigerator, so that the information can be displayed on the display of the refrigerator.

As one of the embodiments, suppose that a mobile apparatus may store information about a washing schedule under a system including the mobile apparatus and the washing machine. If a user moves the mobile apparatus close to the washing machine, the information about the washing schedule stored in the mobile apparatus is transmitted to the washing machine. The washing machine stores the information about the washing schedule received from the mobile apparatus, and performs operations in accordance with the stored information about the washing schedule.

According to these embodiments, data can be easily transmitted between the apparatus by only a simple operation of moving one apparatus close to the other apparatus.

As described above, when the electronic apparatus moves close to the external apparatus in the system including the electronic apparatus and the external apparatus, the electronic apparatus may be designated as the transmitter or the receiver in accordance with previous settings. For this designation, additional conditions may be given.

For example, the intensity of the wireless signal between the electronic apparatus and the external apparatus may be higher than the threshold in the initial state. In this state, a user may make a specific motion with the electronic apparatus in the initial position of the electronic apparatus without moving the electronic apparatus close to the external apparatus. The electronic apparatus senses its own motion through the built-in sensor, and is then designated as the transmitter or the receiver in accordance with sensing results. Here, the specific motion may include various motions made when a user shakes the electronic apparatus, a user indicates the external apparatus with the electronic apparatus, a user rotates the electronic apparatus, etc.

Further, a certain apparatus may be designated as only the receiver in accordance with its characteristics, e.g. a main function. For example, in the system including the electronic apparatus and the external apparatus, if the electronic apparatus is the loudspeaker, the electronic apparatus is designated as the receiver rather than the transmitter since the loudspeaker typically receives audio data from other apparatuses. If the electronic apparatus is washing machine, the electronic apparatus is designated as the receiver since the washing machine is not only too heavy to be easily movable by a user but also rarely transmits specific information to other apparatuses. In this regard, flag information for designating a specific apparatus as the transmitter or the receiver is stored in the electronic apparatus and shared with another apparatus. Below, an embodiment related to this will be described.

Figure 9:
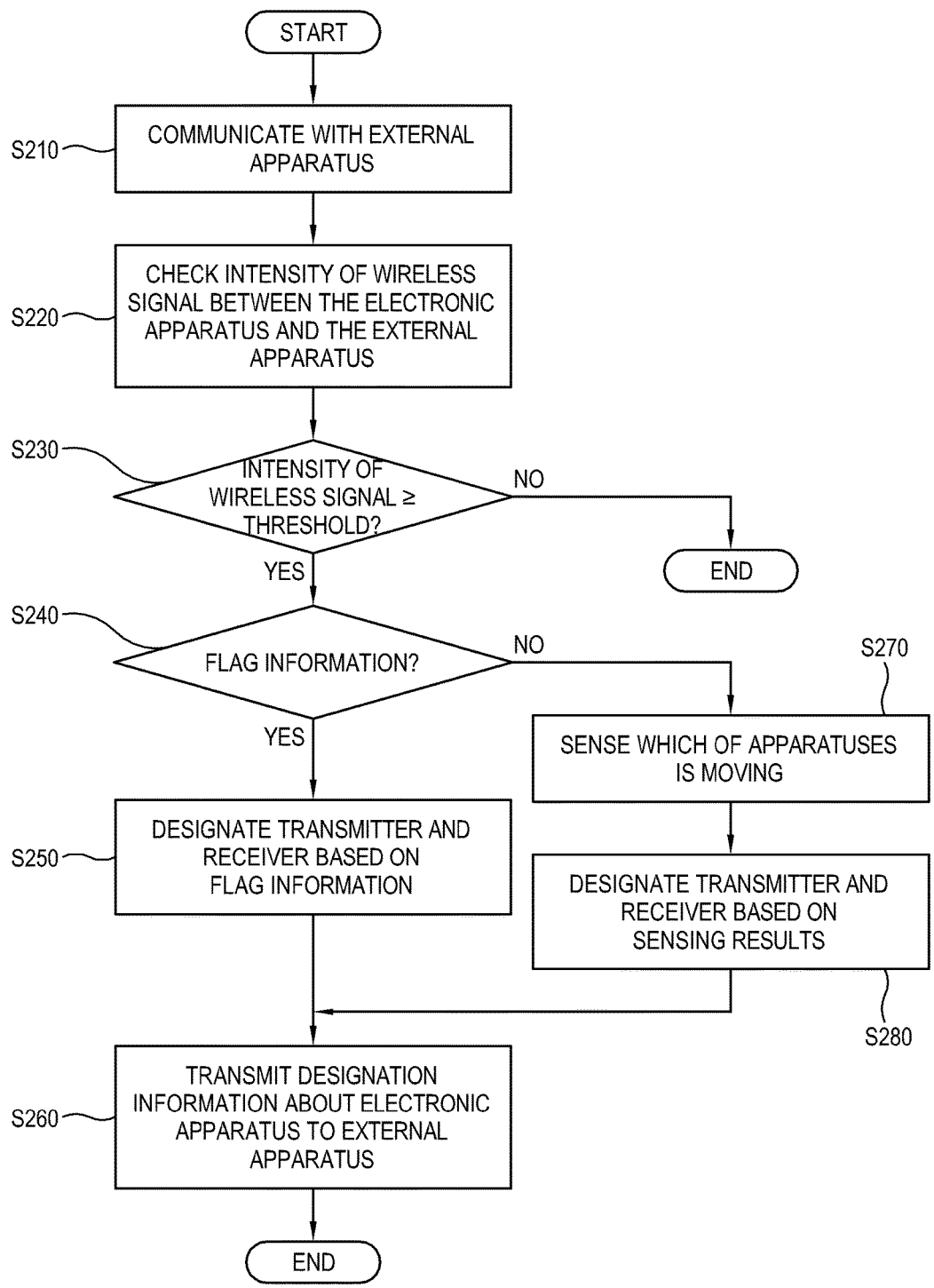
FIG. 9 is a flowchart illustrating an example of controlling the electronic apparatus according to an example embodiment.

FIG. 9 is a flowchart illustrating an example of controlling the electronic apparatus according to an example embodiment.

As illustrated in FIG. 9, at operation S210 the electronic apparatus communicates with the external apparatus.

At operation S220 the electronic apparatus checks the intensity of the wireless signal between the electronic apparatus and the external apparatus.

At operation S230 the electronic apparatus determines whether the intensity of the wireless signal is higher than or equal to the preset threshold.

If the intensity of the wireless signal is higher than the threshold, at operation S240 the electronic apparatus determines whether there is the flag information about the designation of the transmitter or the receiver. The flag information may be stored in the electronic apparatus, or another apparatus or a server on the Internet, to which the electronic apparatus can have an access.

If there is the flag information, at operation S250 the flag information is called by the electronic apparatus, and the electronic apparatus is designated as the transmitter or the receiver based on the designations in the flag information. At operation S260 the electronic apparatus transmits information about the designation of the electronic apparatus to the external apparatus, and the external apparatus is then designated as the transmitter or the receiver by taking the designation of the electronic apparatus into account.

On the other hand, if there are no flag information in operation S240, at operation S270 the electronic apparatus senses which one of the electronic apparatus and the external apparatus moves. At operation S280 the electronic apparatus is designated as the transmitter or the receiver based on the sensing results.

The features of this example embodiment are as follows. Change from an initial connection state where the electronic apparatus and the external apparatus start to communicate with each other into a state where the intensity of the wireless signal between the electronic apparatus and the external apparatus is higher than the threshold means that the electronic apparatus and the external apparatus gets closer to each other. In the foregoing example embodiments, it is determined which one of the electronic apparatus or the external apparatus moves in order to designate the transmitter and the receiver. By the way, if the flag information is stored in the electronic apparatus or the external apparatus, it is easy to designate the transmitter or the receiver without determining which one of them moves.

Figure 10:
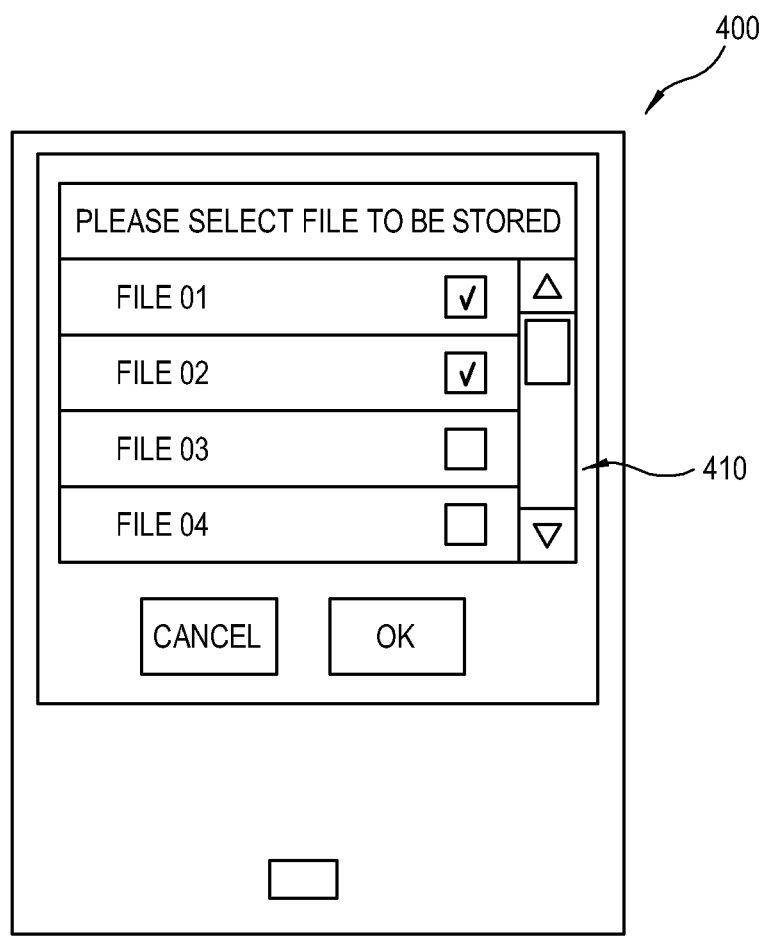
FIG. 10 is a diagram illustrating an example of a UI that the electronic apparatus according to an example embodiment selects whether to store data received from an external apparatus.

FIG. 10 is a diagram illustrating an example of a UI that the electronic apparatus according to an example embodiment selects whether to store data received from an external apparatus.

As illustrated in FIG. 10, after an electronic apparatus 400 is designated as the receiver, the electronic apparatus 400 receives data from the transmitter, e.g., the external apparatus. The electronic apparatus 400 may automatically store the received data, or display a UI 410 prepared for selecting whether to store the received data.

The features of the UI 410 are not limited to a specific shape or function, and the UI 410 basically allows a user to select whether to store all or some of the data received in the electronic apparatus 400. If the received data includes a plurality of files, the UI 410 shows a list of files so that a user can select each of the files and store or delete the selected file. Through the UI 410, a user can make all the data received from the external apparatus be stored in the electronic apparatus 400, or only some of the data be stored in the electronic apparatus 400. Further, the UI 410 may include information about the external apparatus from which the data is transmitted.

The electronic apparatus 400 may perform additional operations while storing the data. For example, if the electronic apparatus 400 has an application capable of opening the data, the electronic apparatus 400 may automatically open the data through the application. In addition, the electronic apparatus 400 may display a UI for allowing a user to select whether to open the data through the application, and may selectively open the data in accordance with the selection in the UI.

The methods according to the foregoing example embodiments may be achieved in the form of a program command (s) that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the example embodiments. The program command recorded in this storage medium may be specially designed and configured according to the example embodiments, or may be publicly known and available to those skilled in the art of computer software.

Although a various example embodiments have been illustrated and described, it will be appreciated by those skilled in the art that various changes, modifications, variations, alternatives, or the like, may be made in these example embodiments without departing from the principles and spirit of the disclosure, the scope of which is defined in the appended claims and their equivalents.

What is claimed is:
1. An electronic apparatus comprising:
a sensor configured to detect a movement of the electronic apparatus;
a communicator comprising communication circuitry configured to wirelessly communicate with one or more external apparatuses;
a signal processor configured to process data; and
a controller configured to:
detect one of the electronic apparatus and the external apparatus which move close to each other within a preset distance,
based on a first movement of the electronic apparatus moving close to the external apparatus, designate the communicator as a transmitter for transmitting data and designate the external apparatus as a receiver for receiving the data from the transmitter,
based on a second movement of the electronic apparatus detected by the sensor and the communicator being designated as the transmitter, control the communicator to transmit the data corresponding to the detected second movement to the external electronic apparatus as the receiver, and
based on a third movement of the external apparatus moving close to the electronic apparatus instead of the first movement of electronic apparatus, designate the external apparatus as a transmitter for transmit- ting data and designate the communicator as a receiver for receiving the data from the transmitter.

2. The electronic apparatus according to claim 1, wherein the controller is configured to determine that the external apparatus is within the preset distance of the electronic apparatus if intensity of a wireless signal received from the external apparatus through the communicator is greater than a preset threshold.

3. The electronic apparatus according to claim 1, wherein the controller is configured to determine which one of the electronic apparatus and the external apparatus is moving, based on at least one of: sensing information from the sensor and information about movement of the external apparatus received through the communicator.

4. The electronic apparatus according to claim 1, wherein the controller is configured to determine which one of the electronic apparatus and the external apparatus receives a motion gesture, based on at least one of sensing information from the sensor and information about the motion gesture of the external apparatus received through the communicator.

5. The electronic apparatus according to claim 1, wherein the controller is configured to determine an application capable of opening data received from the external apparatus designated as the transmitter, and to automatically open the received data with the determined application.

6. The electronic apparatus according to claim 1, wherein the controller is configured to determine whether there is information designating the communicator as the transmitter or the receiver, and to designate the communicator as the transmitter or the receiver based on the information regardless of movement of the electronic apparatus or the external apparatus if it is determined that there is designating information.

7. The electronic apparatus according to claim 1, wherein the controller is configured to control a display to display a user interface (UI) for allowing a user to select at least one of plural pieces of data to be acquirable by the electronic apparatus, and to control the communicator to send the external apparatus the data selected by an input to the UI.

8. The electronic apparatus according to claim 7, further comprising a storage, wherein
the data to be acquirable by the electronic apparatus comprises data stored in the storage, or data stored in another apparatus and receivable through the communicator.

9. The electronic apparatus according to claim 1, wherein the controller is configured to call for a selection history of the previously stored pieces of data, and to control the communicator to send the external apparatus a piece of data corresponding to the called selection history from among previously stored pieces of data.

10. The electronic apparatus according to claim 1, further comprising:
a storage configured to store information in which a group of data is designated corresponding to a user's motion, wherein
the controller is configured to control the sensor to sense a motion of the user, and to control the communicator to transmit the group of data designated in the information to the external apparatus based on the sensed motion of the user.

11. A non-transitory computer-readable recording medium having stored thereon program code which, when executed by a processor of an electronic apparatus, causes the electronic apparatus to perform at least one operation comprising:
detecting one of an external apparatus and the electronic apparatus which move close to each other within a preset distance;
based on a first movement of the electronic apparatus moving close to the external apparatus, designating the electronic apparatus as a transmitter for transmitting data and the external apparatus as a receiver for receiving the data from the transmitter;
based on a second movement of the electronic apparatus detected by the sensor and the electronic apparatus being designated as the transmitter, transmitting the data corresponding to the detected second movement to the external electronic apparatus as the receiver; and
based on a third movement of the external apparatus moving close to the electronic apparatus instead of the first movement of electronic apparatus, designating the external apparatus as a transmitter for transmitting data and designating the communicator as a receiver for receiving the data from the transmitter.

12. The non-transitory computer-readable recording medium according to claim 11, wherein the detecting comprises determining that the external apparatus is within the preset distance of the electronic apparatus if an intensity of a wireless signal received from the external apparatus through communication circuitry of the electronic device is higher than a preset threshold.

13. The non-transitory computer-readable recording medium according to claim 11, wherein the determining comprises determining which one of the electronic apparatus and the external apparatus is moving, based on at least one of: sensing information from a sensor of the electronic apparatus for sensing movement of the electronic apparatus and information about movement of the external apparatus received from the external apparatus.

14. The non-transitory computer-readable recording medium according to claim 11, wherein the at least one operation further comprises determining which one of the electronic apparatus and the external apparatus receives a motion gesture, based on at least one of: sensing information from a sensor of the electronic apparatus for sensing the motion gesture of the electronic apparatus and information about the motion gesture of the external apparatus received from the external apparatus.

15. The non-transitory computer-readable recording medium according to claim 11, wherein the at least one operation further comprises:
determining an application capable of opening data received from the external apparatus designated as the transmitter; and
automatically opening the received data with the determined application.

\* \* \* \* \*